(12) United States Patent
Kalfus et al.

(10) Patent No.: US 11,128,371 B2
(45) Date of Patent: Sep. 21, 2021

(54) DIGITAL ENHANCED CORDLESS TELECOMMUNICATIONS SYSTEM AND METHOD

(71) Applicant: DSP Group Ltd., Herzliya (IL)

(72) Inventors: Nir Kalfus, Pardesiya (IL); Haim Ben-Sinior, Pardesiya (IL); Otmar Rengert, Nuemberg (DE)

(73) Assignee: DSP GROUP LTD., Herzliya (IL)

( * ) Notice: Subject to any disclaimer, the term of this patent is extended or adjusted under 35 U.S.C. 154(b) by 0 days.

(21) Appl. No.: 16/404,769

(22) Filed: May 7, 2019

(65) Prior Publication Data
US 2020/0358524 A1    Nov. 12, 2020

(51) Int. Cl.
*H04B 7/26* (2006.01)
*H04M 1/725* (2021.01)
*H04M 1/72502* (2021.01)

(52) U.S. Cl.
CPC ...... *H04B 7/2615* (2013.01); *H04M 1/72502* (2013.01); *H04M 2250/08* (2013.01)

(58) Field of Classification Search
CPC .. H04B 7/2615; H04B 7/2618; H04B 7/2621; H04M 1/72502; H04W 52/04; H04W 52/16; H04W 52/24; H04W 52/36; H04W 52/44; H04W 52/226; H04W 52/242; H04W 52/245
See application file for complete search history.

(56) References Cited

U.S. PATENT DOCUMENTS

| | | | | |
|---|---|---|---|---|
| 5,995,500 A * | 11/1999 | Ma | ........................ | H04W 84/08 370/337 |
| 6,119,015 A * | 9/2000 | Eun | ........................ | H04M 1/733 455/502 |
| 6,487,392 B1 * | 11/2002 | Sonetaka | .............. | H04W 16/10 455/11.1 |
| 6,683,886 B1 * | 1/2004 | van der Tuijn | ... | H04W 72/1242 370/458 |
| 7,190,686 B1 * | 3/2007 | Beals | ................... | H04B 7/2687 370/337 |
| 2010/0272083 A1 * | 10/2010 | Itoh | ........................ | H04W 24/02 370/338 |
| 2013/0272277 A1 * | 10/2013 | Suwa | ................. | H04W 74/0816 370/336 |
| 2016/0073270 A1 * | 3/2016 | Kobayashi | ............ | H04W 36/20 455/452.1 |
| 2016/0286502 A1 * | 9/2016 | Sugitani | .............. | H04W 52/245 |
| 2019/0200149 A1 * | 6/2019 | Abe | ........................ | H04R 1/406 |

* cited by examiner

*Primary Examiner* — Candal Elpenord
(74) *Attorney, Agent, or Firm* — Reches Patent

(57) ABSTRACT

A DECT system and a method for communicating between a DECT fixed point and multiple DECT portable points. The method may include step (a) of communicating between a master communication processor of the DECT fixed point and one or more DECT portable points during master communication slots. The method may also include step (b) of communicating between a slave communication processor of the DECT fixed point and at least one of the DECT portable points during slave communication slots. Step (a) and step (b) are executed according to an allocation of master communication slots and slave communication slots, wherein the allocation facilitates concurrent slave communication processor communications and master communication processor communications.

27 Claims, 7 Drawing Sheets

| Slot # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Master Frame 210 | | | | D | | | | | | | | | S | S | S | | S | S | S | S | S | S | S | S |
| Slave Frame 220 | | | | | | | | | | | | | | | | | | | | | | | | |

FIG. 3

| Slot # | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Master Frame 210 | TX | TX | D | TX | TX | TX | TX | TX | TX | TX | TX |  | RX | RX | RX |  | RX | RX | RX | RX | RX | RX | RX |  |
| Slave Frame 220 |  |  |  |  |  |  |  |  |  |  |  |  | S | S | S |  | S | S | S | S | S | S | S | S |

FIG. 5

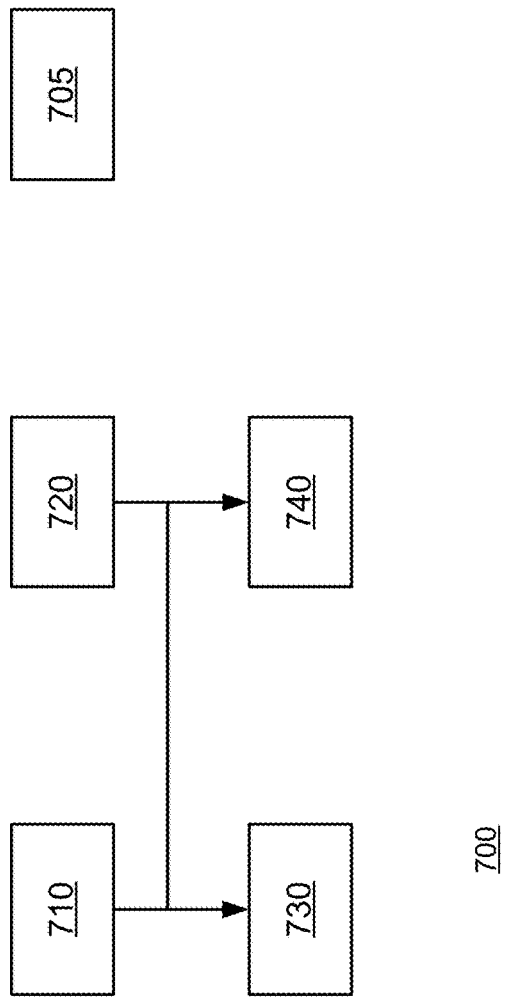

DIGITAL ENHANCED CORDLESS TELECOMMUNICATIONS SYSTEM AND METHOD

CROSS REFERENCE

This application claims priority from U.S. provisional patent 62/669,413 filing date May 10, 2019.

BACKGROUND OF THE DISCLOSURE

Devices conforming to the Digital Enhanced Cordless Telecommunications (DECT) standard are used in both voice and data applications.

The DECT standard defines a structure of frames with duration 10 ms each frame consisting of twenty-four timeslots. In addition, there are ten frequency carriers that can be used, resulting in two hundred and forty slot/carrier pairs.

A DECT multi-frame 101 (see FIG. 1) has sixteen frames 102 and has duration of 160 ms. Each frame has duration of 10 ms and has twenty-four slots.

Each slot 103 is 416.7 μs in duration and during this slot there may be transmitted a packet that may include an S-field, an A-field, a B-field, two error check fields and a guard period.

The frame is split into two equal halves: slots 0 to 11 are used for the downlink fixed part to portable part transmission and slots 12-23 are used for the uplink portable part to fixed part transmission.

The downlink and uplink slots are paired, such that they are 5 ms apart. For example, if slot 2 is used for the downlink, then slot 14 would be used as the uplink.

With twenty-four slots a single fixed part could support twelve simultaneous duplex connections but in practice, in order to accommodate the required fast frequency changes between slots, the number of usable slots is often limited to less and the free slots are used to change the radio frequency.

The DECT system operates using periodic transmissions on a particular slot/carrier pair. The periodic transmission is termed a "bearer".

There are two types of bearers used in the DECT standard: dummy bearers, and traffic bearers. The dummy bearer is a simplex bearer transmitted by the fixed part and carries identity information and other data which a portable part requires in order to lock on to the fixed part. A traffic bearer is a duplex bearer transmitted by both a fixed part and a portable part and carries the signaling information and application data.

In a typical DECT system a single fixed part (such as a DECT base station) may serve a limited number (for example five) of portable parts (such as cordless DECT telephones). The fixed point (FP) may be coupled to the public switched telephone network (PSTN).

There is a growing need to allow a fixed point to serve a large number of portable points (PPs).

SUMMARY

There may be provided methods, non-transitory computer readable media, DECT system, DECT fixed point, DECT portable points as illustrated in the specification and/or drawings and/or claims.

DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3-6 illustrates examples of master frames and slave frames; and

FIG. 7 illustrates an example of a method.

DETAILED DESCRIPTION OF THE INVENTION

Figure 1:
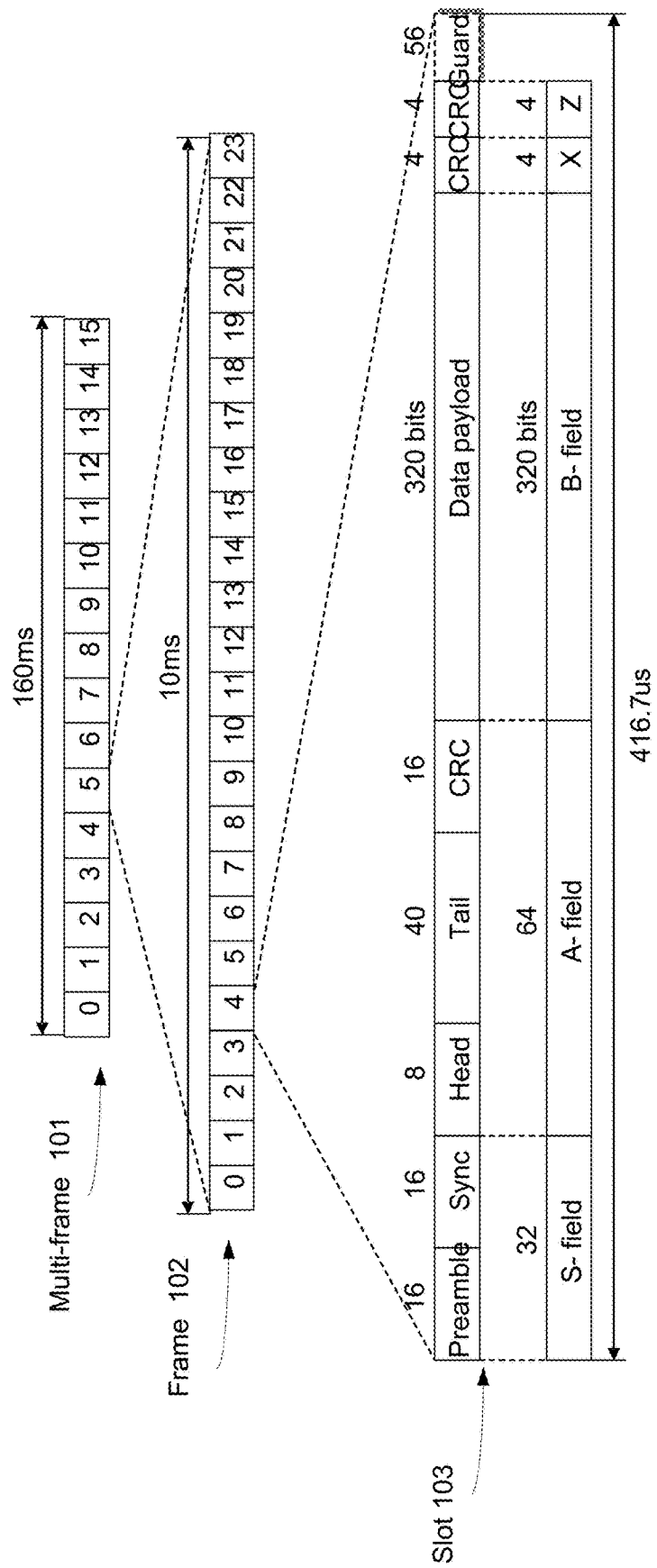
FIG. 1 is a diagram of a prior art DECT slot and frame structure.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device capable of executing the method and should be applied mutatis mutandis to a non-transitory computer readable medium that stores instructions that once executed by a computer result in the execution of the method.

Any reference in the specification to a device should be applied mutatis mutandis to a method that may be executed by the device and should be applied mutatis mutandis to a non-transitory computer readable medium that stores instructions that may be executed by the device.

Any reference in the specification to a non-transitory computer readable medium should be applied mutatis mutandis to a device capable of executing the instructions stored in the non-transitory computer readable medium and should be applied mutatis mutandis to method that may be executed by a computer that reads the instructions stored in the non-transitory computer readable medium.

Master and Slave Frames

Figure 2:
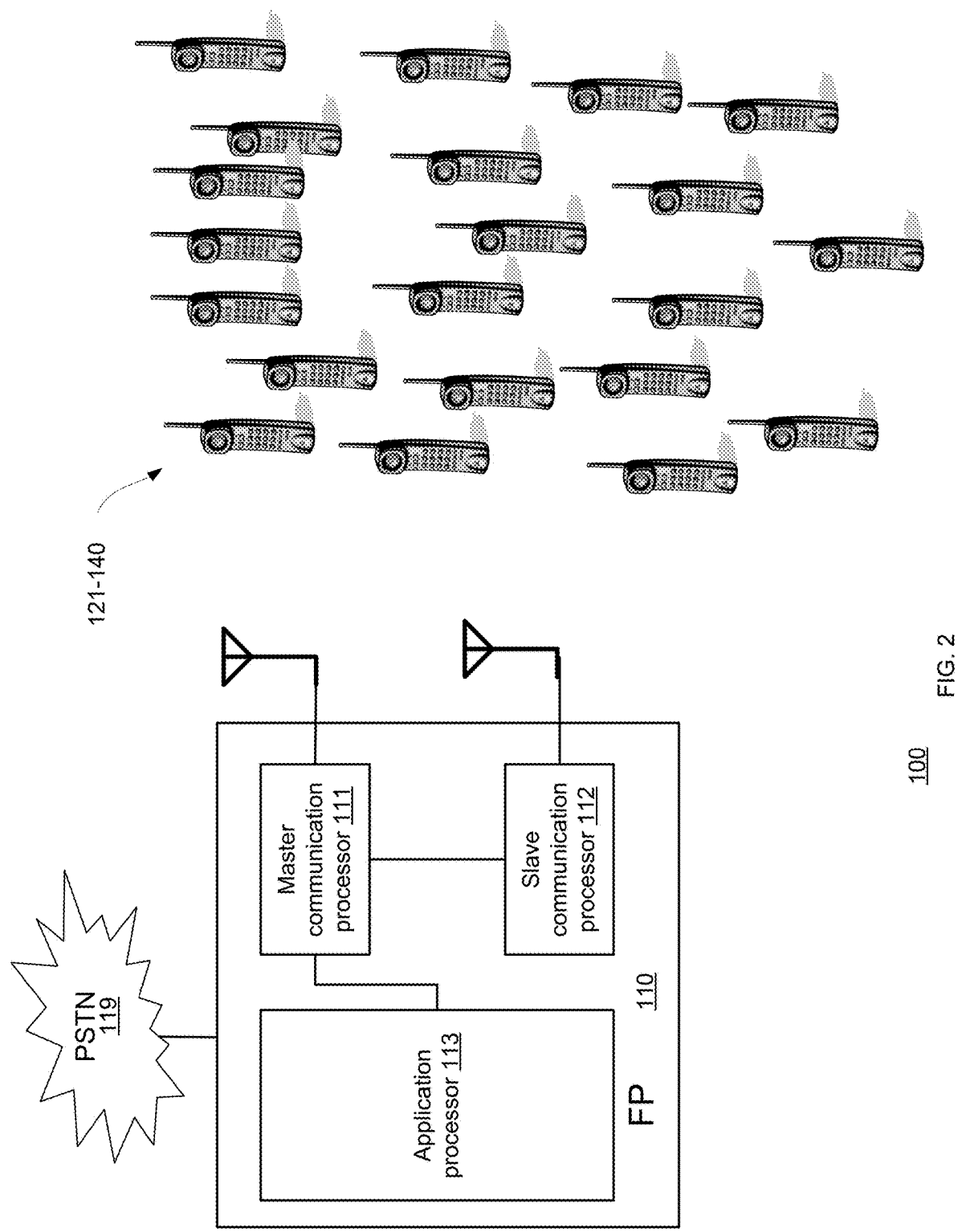
FIG. 2 illustrates an example of a DECT system.

FIG. 2 illustrates a fixed point (FP) 110 that includes an application processor 113 (such as but not limited to the DVF101 chip of DSP Group Ltd of Israel), a master communication processor 111 and a slave communication processor 112. The master communication chip and the slave communication chip may be, for example, a DCX81 chip of DSP Group Ltd of Israel. The master communication processor 113 may perform tasks related, for example, to Voice Over IP, while the master communication processor 111 and a slave communication processor 112 may perform DECT related tasks. Any other task allocation may be provided.

FP 110 may be coupled to a network such as public switched telephone network PSTN 119 and may be wirelessly coupled to PPs such as 121-140.

FP 110 and PPs 121-140 may form a DECT system.

The master communication processor and the slave communication processor may be synchronized with each other in the sense that their slots are synchronized—even at the bit level.

The master communication processor may control the communication at all communication layers (may manage the entire communication stack)—while the slave communication processor may manage only the lowest layers of the communication stack—such as PHY layer. For example—the slave communication processor may perform PHY operations (such as burst mode processing {BMP}). The slave communication processor may include a BMP circuit and a BMP controller.

It should be noted the the slave communication processor may perform operations related to additional communication layers.

The master communication processor may communicate with the PPs using a master frames—each master frame includes twenty-four master slots.

The slave communication processor may communicate with the PPs using a slave frames—each slave frame includes twenty-four slave slots.

The master frame and the slave frame are synchronized— even may be synchronized at the bit level.

Each master slot corresponds to a slave slot that occurs at the same time period.

A time period associated with a certain slave slot and a certain master slot is deemed as a ed time period only when both certain master slot and the certain slave slot are used by the master communication processor (for communicating with a PP) and the slave communication processor (for communicating with another PP).

Accordingly—a specific time slot is marked as unblocked when (i) it is not used by either one of the master communication processor and the slave communication processor, or (ii) when it is used by only one of the master communication processor and the slave communication processor.

Accordingly—when a certain master slot is used—but the corresponding certain slave slot is not used—a PP that wished to communicate with the slave communication processor may still use the time period associated with the certain slave slot.

The master communication processor and the slave communication processor may communicate with each other. They may exchange control and/or data. The control may include one or more synchronization signals.

The master and slave communication processors may perform measures for reducing the interference—especially when both master and slave communication processors use corresponding master and slave time slots.

For example—the master and slave communication processors may use carriers that differ from each other—for example—different frequencies used during the same time period may be spaced apart by at least one or two DECT channels.

The allocation of frequencies used by the master communication processor and the slave communication processor can be determined by at least one of the master and slave communication processors and/or may be set by yet another entity.

The allocation of frequencies can be done in any manner.

The allocation of frequencies (channels) to the master slots and to the slave slots is communicated to the PPs served by the fixed point. This allocation may be communicated in various manners—by using broadcast communication, paging, dummy bearers, A-field and/or B-fields of the dummy bearers, and the like.

The PPs may be requested, instructed or configured to prioritize the usage of one or more master slots over corresponding one or more slave frames. Alternatively, any PP may select between the slave and/or master slots in any manner—according to one or more defined rules, in a random manner or in pseudo random manner. The one or more defined rules may be responsive to actual and/or estimated interference, previous successes and/or failures when using the slots, and the like.

FIGS. 3-6 illustrates examples of various master frames 210 and slave frames 220. It is assumed, in these examples, that the PPs prioritize using master slots.

In FIG. 3—the master communication processor transmits a dummy bearer (D) on slot 3 and performs setup scanning (S) to detect transmissions from PPs at slots 12-14 and 16-23. The slave communication processor may be idle.

Figure 4:
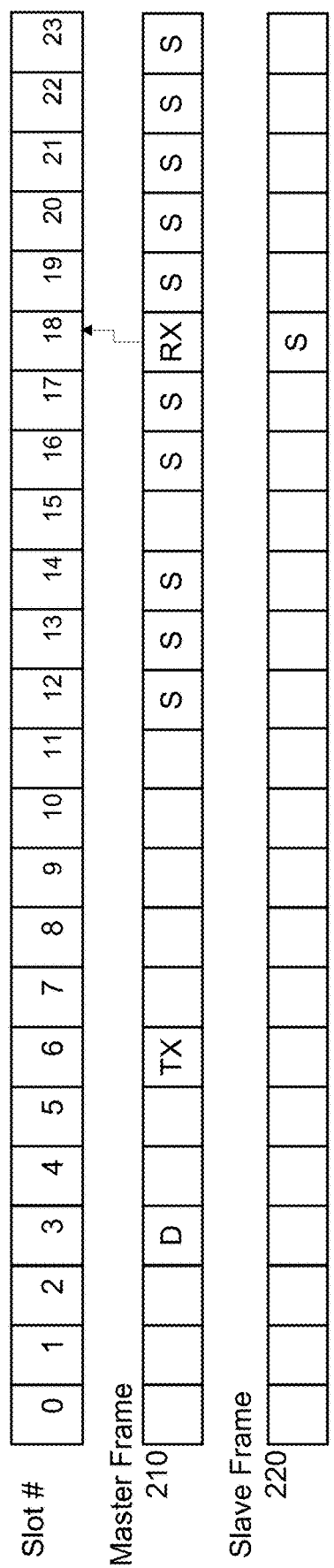

In FIG. 4—a link is established between the FP and a PP—using slot 6 for transmission (TX) of a traffic bearer from the FP, and slot 18 (RX) for receiving information from the PP by the FP.

The slave communication processor performs setup scanning (S) to detect transmissions from PPs at slot 18. Slot 18 can still be used (not blocked) because the slave communication processor can receive transmissions from PPs at slot 18.

The master communication processor also transmits a dummy bearer (D) on slot 3 and performs setup scanning (S) to detect transmissions from PPs at slots 12-14, 16-17 and 19-23.

In FIG. 5—ten links are established between the FP and multiple PP—using slots 0-2 and 4-10 for transmission (TX) of traffic bearers from the FP, and slots 12-14 and 16-22 for receiving information from the PPs by the FP.

The slave communication processor performs setup scanning (S) to detect transmissions from PPs at slots 12-14 and 16-22. Slots 12-14 and 16-22 can still be used (not blocked) because the slave communication processor can receive transmissions from PPs at slots 12-14 and 16-22.

The master communication processor also transmits a dummy bearer (D) on slot 3 and performs setup scanning (S) to detect transmissions from PPs at slot 23.

Figure 6:
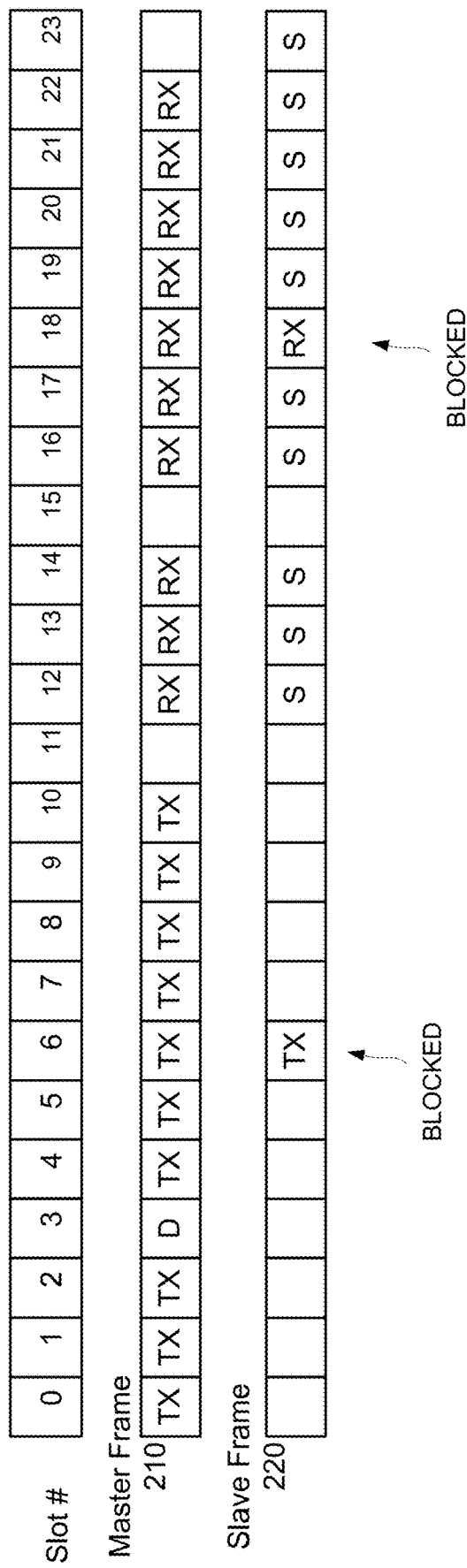

The slave frame of FIG. 6 differs from the slave frame of FIG. 4—by the establishment of a link between the slave communication processor and a certain PP—using slots 6 for transmission (TX) from the slave communication processor—and using slot 18 for reception (RX) of transmission from the certain PP.

Slots 6 and 18 are blocked for use of any PP that differs from the certain PP.

Portable Point Power Management

The FP may receive from different PPs communications of different levels. This may occur, for example, when the PPs are positioned at different distances from the FP and/or when the communication paths between the PPs and the FP have different attenuations.

A stronger communication can mask a weaker communication.

In order to reduce the masking—the PPs may be configured (for example by program update) to apply a transmission power control scheme that may provide a tradeoff between the quality of transmission and masking potential.

The transmission power control scheme may include at least one out of:

a. Determining the transmission level based on reception parameters (such as Dummy bearer RSSI value)—even before establishing a link—instead of first transmitting at a maximal power level and then reducing the transmission power level.

b. Reducing the transmission level below a maximal transmission level—while maintaining an acceptable quality of reception by the FP.

c. In case of reception errors (that may be detected when CRC errors occur)—perform a handover before increasing the transmitted power level. The PP may inform the FP about the channel it intends to jump to—and the FP may tune itself to receive the communication accordingly.

There may be provided a method for operating the DECT FP and multiple PP as illustrated above.

There may be provided a method for communicating between the DECT FP and multiple PP as illustrated above. The method may include utilizing a slave frame and a master frame for said communication.

There may be provided a method for power management related to a communication between the DECT FP and the multiple PP as illustrated above.

FIG. 7 illustrates an example of method 700.

Method 700 is for communicating between a digital enhanced cordless telecommunications (DECT) fixed point and multiple DECT portable points.

Method 700 may start by either one of steps 710 and 720.

Step 710 may include determining an allocation of master communication slots and slave communication slots. The allocation facilitates concurrent slave communication processor communications and master communication processor communications.

The allocation defines a certain time period associated with a certain slave communication slot and a certain master communication slot as a blocked time period (thus fully used) when the certain master communication slot is used by the master communication processor and the certain slave communication slot is used by the slave communication processor.

Step 720 may include receiving the allocation.

Steps 710 and 720 may be followed by steps 730 and 740. Steps 730 and 740 may be executed concurrently in the sense that during each time period (associated with a slave communication slot and a master communication slot) both master communication processor and slave communication processor may communicate—thus virtually multiplying the capacity of the communication channels between the DECT fixed point and the DECT portable points—and increasing the number of DECT portable points that can be serviced by the DECT fixed point.

Step 730 may include communicating between a master communication processor of the DECT fixed point and one or more DECT portable points during master communication slots.

Step 740 may include communicating between a slave communication processor of the DECT fixed point and at least one of the DECT portable points during slave communication slots.

Each one of the slave communication processor and the master communication processor may communicate with any of the DECT portable points.

Per each time period, the master communication processor and the slave communication processor may communicate using different frequencies.

Step 710 may be executed by the master communication processor or by another entity.

Step 730 may include utilizing at least one or more communication layer that is not included in a communication of 740.

Step 730 may be limited to one or more lower communication layer of a communication stack while step 740 may include utilizing any layer of the communication stack.

Method 700 may also include step 705 of controlling and/or configuring the DECT portable ports by the DETC fixed point.

Step 705 may include, for example instructing or requesting a DECT portable port to prioritize a usage of a master communication slot over a slave communication slot.

The execution of step 730 and/or step 740 may include selecting, by a DECT portable port, between using a master communication slot and a slave communication slot.

The selecting can be made according to one or more rules, in a random manner, in a pseudo random manner, based on (actual or estimated) communication interference, based on a history of previous communications (successes and/or failures).

The execution of step 730 and/or step 740 may include applying by a DECT portable port of the multiple DECT portable ports a transmission power control scheme.

The applying of the transmission power control scheme may include determining a transmission level of the DECT portable port based on a reception parameter before establishing a link between the DECT portable port and the DECT fixed point.

The applying of the transmission power may include detecting a reception error and performing a handover before increasing the transmitted power level.

The applying of the transmission power control scheme may be executed by a DECT portable point when communicating with a DECT fixed point regardless of the execution of method 700.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for communicating between a digital enhanced cordless telecommunications (DECT) fixed point and multiple DECT portable points, the method comprises:
    (a) communicating between a master communication processor of the DECT fixed point and one or more DECT portable points during master communication slots;
    (b) communicating between a slave communication processor of the DECT fixed point and at least one of the DECT portable points during slave communication slots; and
    wherein step (a) and step (b) are executed according to an allocation of master communication slots and slave communication slots, wherein the allocation facilitates concurrent slave communication processor communications and master communication processor communications;
    wherein the allocation defines a certain time period associated with a certain slave communication slot and a certain master communication slot as a blocked time period when the certain master communication slot is used by the master communication processor for communicating with a first DECT portable point and the certain slave communication slot is used by the slave communication processor for communicating with a second DECT portable point; wherein the communication with the first DECT portable point comprises a first transmission; wherein the communication with the first DECT portable point comprises a second transmission; wherein the first transmission occurs concurrently to the second transmission; wherein the allocation does not allocate a third transmission in concurrency to the first and second transmissions.

2. The method according to claim 1 wherein the first transmission is a transmission from the master communication processor; and wherein the second transmission is a transmission from the slave communication processor.

3. The method according to claim 1 wherein per time period, the master communication processor and the slave communication processor communicate using different frequencies.

4. The method according to claim 1 comprising allocating, by the master communication processor, the master communication slots and slave communication slots.

5. The method according to claim 1 wherein step (a) involves utilizing at least one or more communication layer that is not included in a communication of step (b).

6. The method according to claim 1 wherein step (b) is limited to one or more lower communication layer of a communication stack while step (a) comprises utilizing any layer of the communication stack.

7. The method according to claim 1 comprising instructing or requesting a DECT portable port to prioritize a usage of a master communication slot over a slave communication slot.

8. The method according to claim 1 comprising selecting, by a DECT portable port, between using a master communication slot and a slave communication slot.

9. The method according to claim 8 wherein the selecting is made in a random or pseudo random manner.

10. The method according to claim 8 wherein the selecting is made based on communication interference.

11. The method according to claim 8 wherein the selecting is made based on a history of previous communications.

12. The method according to claim 1 comprises applying by a DECT portable port of the multiple DECT portable ports a transmission power control scheme.

13. The method according to claim 12 wherein the applying of the transmission power control scheme comprise determining a transmission level of the DECT portable port based on a reception parameter before establishing a link between the DECT portable port and the DECT fixed point.

14. The method according to claim 12 wherein the applying of the transmission power control scheme comprise detecting a reception error and performing a handover before increasing the transmitted power level.

15. The method according to claim 1 wherein the one or more DECT portable points are a first plurality of DECT portable points and wherein the at least one of the DECT portable points are a second plurality of DECT portable points.

16. A non-transitory computer readable medium for communicating between a digital enhanced cordless telecommunications (DECT) fixed point and multiple DECT portable points, the non-transitory computer readable medium stores instructions for:
    (a) communicating between a master communication processor of the DECT fixed point and one or more DECT portable points during master communication slots;
    (b) communicating between a slave communication processor of the DECT fixed point and at least one of the DECT portable points during slave communication slots; and
    wherein step (a) and step (b) are executed according to an allocation of master communication slots and slave communication slots, wherein the allocation facilitates concurrent slave communication processor communications and master communication processor communications;
        wherein the allocation defines a certain time period associated with a certain slave communication slot and a certain master communication slot as a blocked time period when the certain master communication slot is used by the master communication processor for communicating with a first DECT portable point and the certain slave communication slot is used by the slave communication processor for communicating with a second DECT portable point; wherein the communication with the first DECT portable point comprises a first transmission; wherein the communication with the first DECT portable point comprises a second transmission: wherein the first transmission occurs concurrently to the second transmission; wherein the allocation does not allocate a third transmission in concurrency to the first and second transmissions.

17. The non-transitory computer readable medium according to claim 16 first transmission is a transmission from the master communication processor; and wherein the second transmission is a transmission from the slave communication processor.

18. The non-transitory computer readable medium according to claim 16 wherein per time period, the master communication processor and the slave communication processor communicate using different frequencies.

19. The non-transitory computer readable medium according to claim 16 that stores instructions for allocating, by the master communication processor, the master communication slots and slave communication slots.

20. The non-transitory computer readable medium according to claim 16 wherein step (a) involves utilizing at least one or more communication layer that is not included in a communication of step (b).

21. The non-transitory computer readable medium according to claim 16 wherein step (b) is limited to one or more lower communication layer of a communication stack while step (c) comprises utilizing any layer of the communication stack.

22. The non-transitory computer readable medium according to claim 16 that stores instructions for instructing or requesting a DECT portable port to prioritize a usage of a master communication slot over a slave communication slot.

23. The non-transitory computer readable medium according to claim 16 that stores instructions for selecting, by a DECT portable port, between using a master communication slot and a slave communication slot.

24. The non-transitory computer readable medium according to claim 23 wherein the selecting is made in a random or pseudo random manner.

25. The non-transitory computer readable medium according to claim 23 wherein the selecting is made based on an interference associated with a communication.

26. The non-transitory computer readable medium according to claim 23 wherein the selecting is made based on a history of previous communications.

27. A digital enhanced cordless telecommunications (DECT) fixed point comprising a master communication processor and a slave communication processor; wherein the master communication processor is configured to communicate with one or more DECT portable points of multiple DECT portable ports during master communication slots; wherein the slave communication processor is configured to communicate with at least one DECT portable points of the multiple DECT portable ports during master communication slots; wherein (a) the master communication processor is configured to communicate with the one or more DECT portable points, and (b) the slave communication processor is configured to communicate with at least one of the DECT portable points, are executed according with an allocation of master communication slots and slave communication slots; and wherein the allocation facilitates concurrent slave communication processor communications and master communication processor communications;

wherein the allocation defines a certain time period associated with a certain slave communication slot and a certain master communication slot as a blocked time period when the certain master communication slot is used by the master communication processor for communicating with a first DECT portable point and the certain slave communication slot is used by the slave communication processor for communicating with a second DECT portable point; wherein the communication with the first DECT portable point comprises a first transmission; wherein the communication with the first DECT portable point comprises a second transmission; wherein the first transmission occurs concurrently to the second transmission; wherein the application does not allocate a third transmission in concurrency to the first and second transmissions.

* * * * *